Dec. 27, 1938.  T. L. FAWICK  2,141,645
ASSEMBLY FOR UNIVERSAL JOINTS AND THE LIKE
Filed Sept. 4, 1936  3 Sheets-Sheet 1
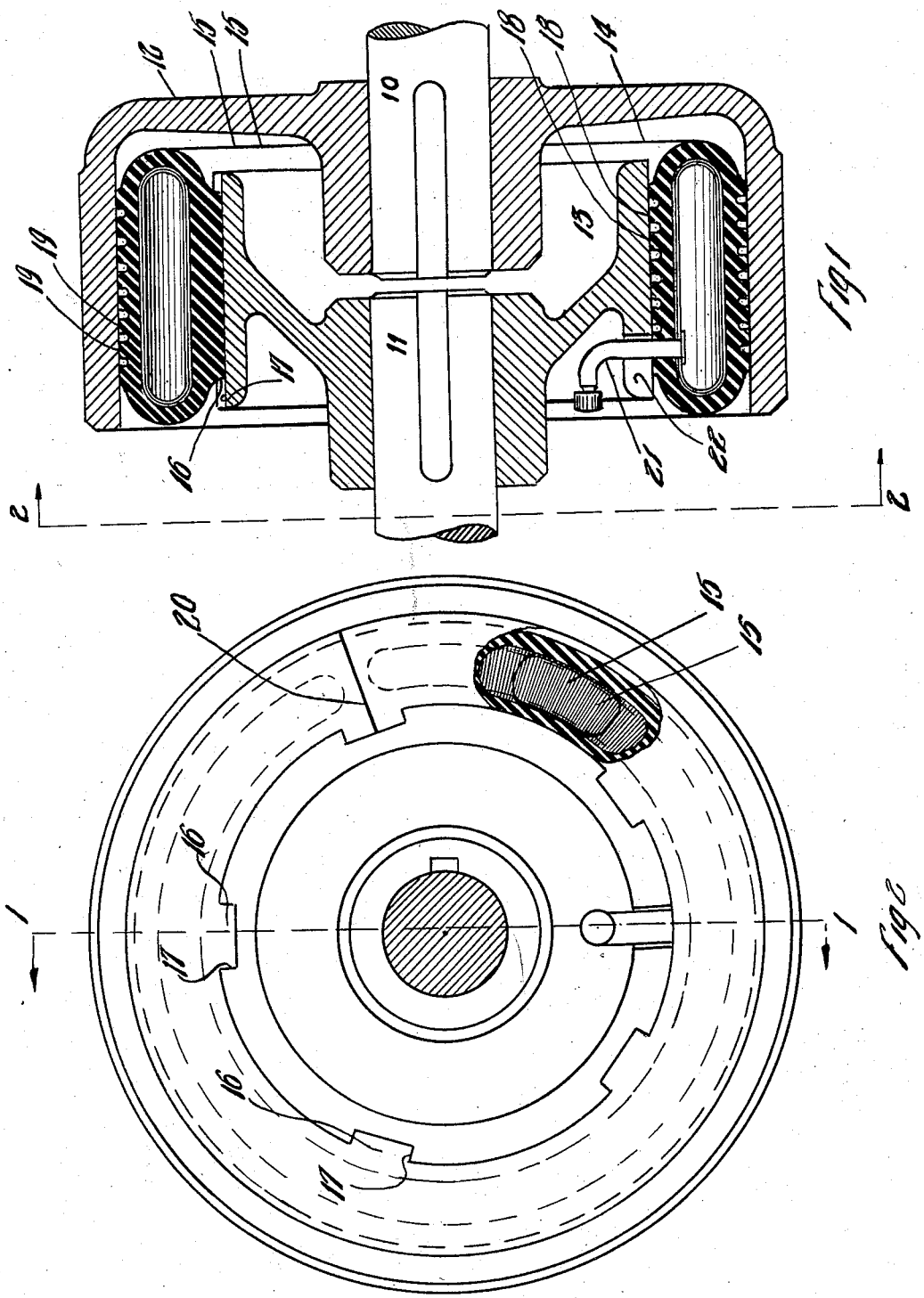
INVENTOR
Thomas L. Fawick
Willard D. Eakin
BY
ATTORNEY

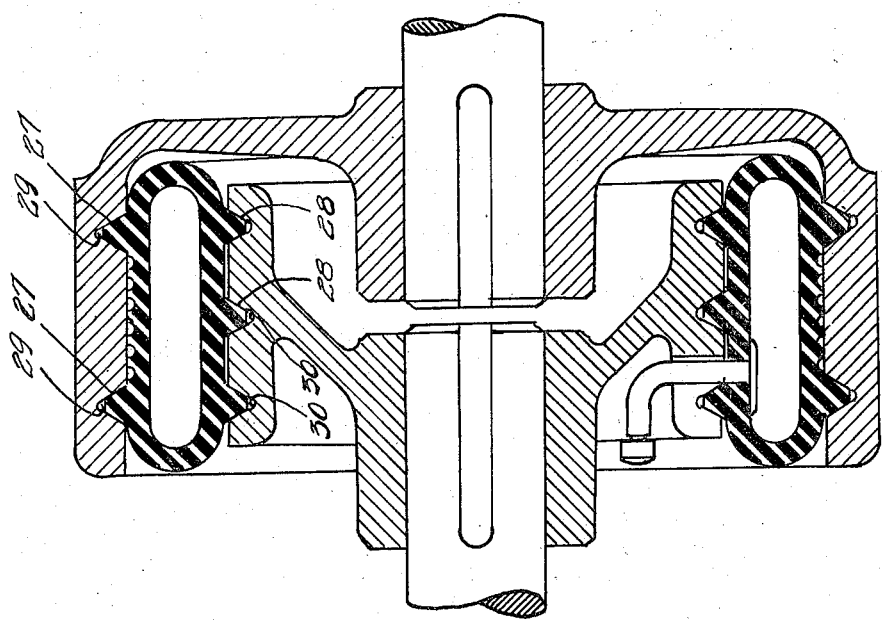
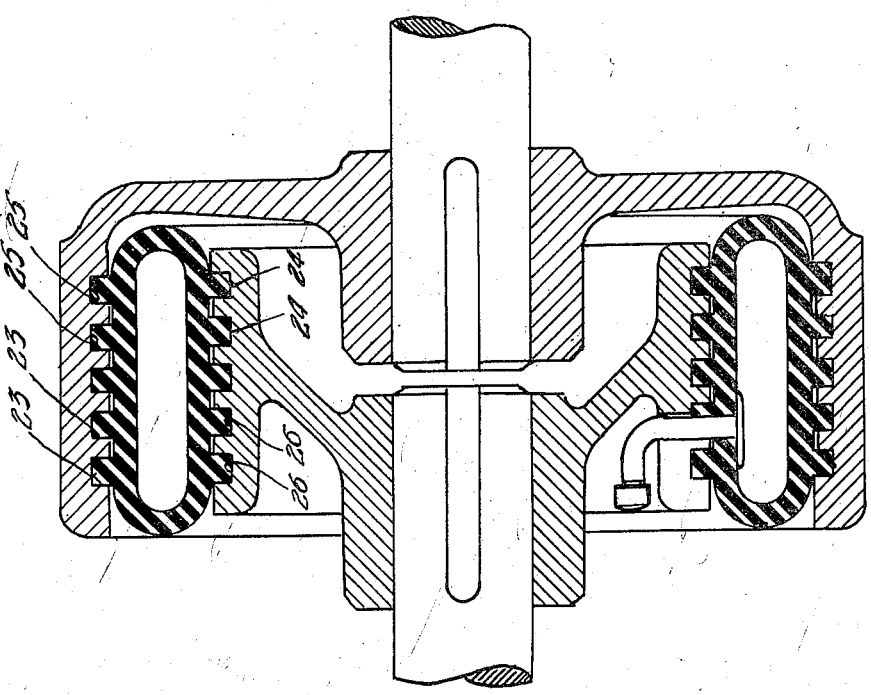

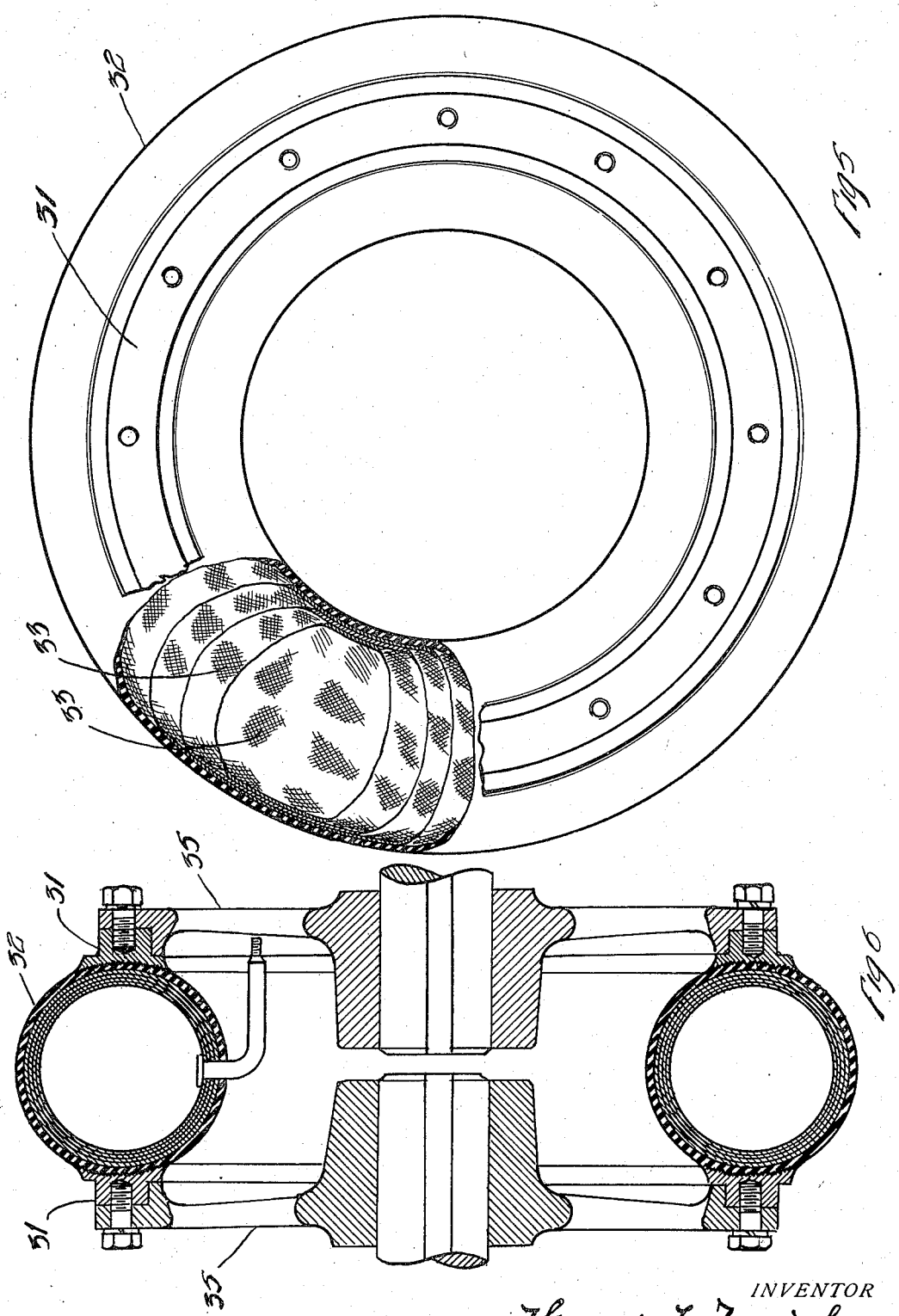

Patented Dec. 27, 1938

2,141,645

UNITED STATES PATENT OFFICE 2,141,645

ASSEMBLY FOR UNIVERSAL JOINTS AND THE LIKE

Thomas L. Fawick, Akron, Ohio

Application September 4, 1936, Serial No. 99,421

9 Claims. (Cl. 64—11)

This invention relates to assemblies suitable for use as universal joints or flexible shaft-couplings, driving clutches, brakes, and the like.

Its chief objects are to provide:

Economy of manufacture; simplicity of construction, ease and economy in the replacement of parts; durability; effective cushioning action; quiet operation; avoidance of slippage and wear; avoidance of the problem of lubrication; economy of power; avoidance of the necessity of close alignment of the driving and driven members; and a strong and dependable driving connection.

This application discloses subject matter which is described and more broadly claimed in my United States Patent No. 2,111,422, granted March 15, 1938.

Of the accompanying drawings:

Fig. 1 is a longitudinal section, on line 1—1 of Fig. 2, of one of the preferred embodiments of my invention in a simple form, a part being broken away to show internal structure.

Fig. 2 is a section on line 2—2 of Fig. 1, showing in elevation parts other than the shafts.

Fig. 3 is a longitudinal section of another preferred embodiment designed for stronger gripping of parts through which the driving force is transmitted.

Fig. 4 is a longitudinal section of still another preferred embodiment, showing another provision for strong gripping of the parts.

Fig. 5 is an elevation of parts of an assembly embodying my invention in another form.

Fig. 6 is a section on line 6—6 of Fig. 5.

Referring to the drawings, and at first to Figs. 1 and 2, the universal-joint there shown as connecting shafts 10 and 11 comprises a bell-shaped member 12 secured on one of the shafts and surrounding a hub-like member 13 secured on the other shaft.

Mounted in the annular space between the bell 12 and the hub 13 is an annular pneumatic bag 14 having the general characteristics of a single-tube pneumatic tire but preferably of special construction particularly adapting it to the present use.

In the embodiment here shown, for example, the bag is formed of vulcanized soft rubber having only radially disposed reinforcing cords, 15, 15, therein, so that the bag is strongly reinforced against internal air pressure and at the same time is adapted to yield easily to permit the weaving relative movements of adjacent parts of the bell 12 and the hub 13, transversely of the bag, in the operation of the joint when the shafts are misaligned, and so that the bag also is adapted to be used between radically misaligned shafts.

Where misalignment is small and the driving load great the bag may be of standard bias cord-fabric construction, but since the rubber of the bag transmits force from one of the embracing members to the other throughout the entire circle of the assembly the radial cords may be employed for quite heavy drives and they are preferable to oblique cords especially in assemblies where the shafts are laterally off-set from each other, whether or not they are parallel, because in that situation oblique cords act somewhat in the manner of tent-ropes or hammock ropes, in two arcs of the circle, in opposition to the off-setting of the shafts.

For the same purpose, as well as for economy of space and for large area of application of the air pressure for strong driving engagement, with the hub member as well as the belt member, and for lightness of construction of the bag for a given air pressure, the tire-like bag is held to a radially flattened shape between the two embracing members, and preferably is mold-vulcanized to approximately that shape, which provides a short radius of curvature in the side walls of the bag and consequently a low strain of the wall for a given air pressure, and also permits the above mentioned weaving movement of the parts without substantial change in the volumetric capacity of the bag and consequently with little resistance to the weaving movement, as compared with a bag of substantially round cross-section used in a similar assembly, the volumetric capacity of a round bag radically decreasing as it departs from circular form.

The pronouncedly flattened form also is important in that in the rolling lateral movement of the bag in contact with the bell member 12 (Fig. 1) the material of the bag does not have to move radially outward very far for a given amount of shaft misalignment and consequently a longitudinal (great circle) zone of material in the side-wall of the bag is not excessively stretched, lengthwise of the side wall, or adapted, by refusal to stretch, to stiffen the coupling excessively against shaft misalignment.

Also, a bag having only radially disposed reinforcing cords is highly stretchable lengthwise of the side-wall. That feature is important whether the bag be pronouncedly flattened or not, but in an assembly having both of these features they both contribute to a high degree of flexibility with avoidance of destructive strains and heat generation.

The flattened form also is of importance in connection with the use of only radial cords for reinforcement, because that form causes the principal lines of force-transmission in the wall of the bag to lie close to tangency with relation to the hub member, so that the force is transmitted largely by simple tension.

To prevent slippage of the bag on the hub member 13 the bag is formed on its inner periphery with circumferentially spaced transverse driving lugs 16, 16 seating in complemental notches 17, 17 formed in the hub member and between the driving lugs 16 the bag is formed with longitudinal ribs 18, 18, preferably high in relation to their width, as such ribs give strong resistance to relative slippage of the parts in the direction of their length.

Similar longitudinal ribs 19, 19 are formed on the outer or tread periphery of the bag for the same purpose, the ribs permissibly being continuous throughout the length of the tread, and as the tread circumference of the bag is considerably greater than the length of its inner periphery, and as the ribs 19 transmit the driving force at the end of a relatively long radius, an adequate grip of the tread against the bell member is provided without transverse driving lugs.

The bags, but especially those used for repair purposes, may be made of "transversely-split" construction, the end faces of the bag preferably meeting, as shown by the line 20 in Fig. 2, at a position intermediate the length of one of the driving lugs 16, this construction permitting the removal of an old bag from the assembly without cutting or breaking it and without shifting any other part of the assembly, and likewise the substitution of a new bag, an inflating stem 21, accommodated in a notch 22 formed in the hub member, being provided for inflating or deflating the bag while it is in operating position.

In the embodiment shown in Fig. 3 the bag is formed on its outer periphery with longitudinal ribs 23, 23 and on its inner periphery with longitudinal ribs 24, 24, which fit into complemental longitudinal grooves 25, 25 and 26, 26 formed in the bell member and the hub member respectively, the ribs being higher than the depth of the grooves so that under the force of the air pressure the ribs bulge laterally and thus tightly grip the walls of the grooves.

In the embodiment shown in Fig. 4 the bag is formed on its outer periphery with longitudinal ribs 27, 27 of trapezoidal cross-sectional form and on its inner periphery with longitudinal ribs 28, 28 of trapezoidal cross-sectional form, the ribs being adapted to be wedged into V-shaped grooves 29, 29 and 30, 30 formed in the bell member and the hub member respectively, the grooves being sufficiently deep in relation to the truncation of the ribs to permit the wedging movement and tightening of the ribs in the grooves without lateral bulging of the ribs.

Figs. 5 and 6 show an embodiment of my invention in which metal rings 31, 31 are vulcanized to opposite sides of an annular rubber bag 32, which preferably is reinforced with obliquely disposed cords 33, 33, in the manner of a pneumatic tire, the rings 31 being formed with threaded holes for securing them to respective universal-joint spiders 35, 35.

In this embodiment the weaving movement of adjacent portions of the side rings incident to angular relation of the shafts is permitted by simple lateral compression and expansion of the bag as distinguished from the lateral rolling action of the bags of Figs. 1 to 4, and this provides for a wide range of angularity of the shafts. A considerable range of lateral off-setting of the shafts also is permitted by a rolling deformation of the bag, but the reinforcing cords 33 preferably are obliquely disposed for the sake of strong transmission of torque with a bag not held to a pronouncedly flattened form, although in this, as well as in the other embodiments shown, obliquely disposed cords place a lower limit on the lateral off-setting of the shafts than the radially disposed cords do.

An advantage of the construction shown and described is that in an installation in which a sympathetic vibration occurs or is likely to occur it can be stopped or avoided by stiffening or softening the bag by increasing or decreasing the fluid-pressure within it and thus changing the natural rate of vibration or harmonics of the assembly.

An inherent feature of the structure as described is that as the bag 14 is deformed in yielding appreciably under the force of the torque the reinforcement cords 15 (Fig. 2) or 33 (Fig. 5) are compelled to straighten somewhat as compared with their curved condition in the bulged side-walls of the bag when it is not under load, and this straightening or reduction of curvature of the cords results in a reduction of the volumetric capacity of the bag, which increases the pressure of the air within the bag, and thus the cushioning of the torque is largely an air-cushioning, with a better modulus and with less generation of heat than would be the case if all of the cushioning were that of the non-fluid parts of the assembly.

It is to be understood that in the appended claims the expression "flattened form" means of less cross-sectional dimension in one direction than in a direction at right-angles thereto, whether the bag be originally mold-vulcanized to that shape or not.

The invention provides in a high degree the advantages set out in the above statement of objects.

I claim:

1. The combination of a mechanism to be driven and, mounted in series for driving the same, a drive shaft, a driven shaft, and a hollow fluid-container formed of flexible material permanently so connecting them as to transmit driving torque solely by frictional engagement at at least one of its peripheries, the said fluid-container being held to an oblong and approximately uniform cross-sectional form, with its smaller dimension radial to the axis of rotation, against the pressure of fluid within it.

2. The combination of a mechanism to be driven and, mounted in series for driving the same, a pair of shafts, a driving member and a driven member mounted upon them respectively and formed with juxtaposed generally cylindrical surfaces, and a fluid-containing bag mounted between, and held to a pronouncedly flattened form throughout its length by contact of, the said surfaces.

3. The combination of a mechanism to be driven and, mounted in series for driving the same, a pair of shafts, a driving member and a driven member mounted upon them respectively, one of the same being formed with an annular inwardly-facing and the other formed with an annular outwardly-facing surface, and a fluid-containing bag mounted between, and held to a pronouncedly flattened form throughout its length by contact of, the said surfaces.

4. The combination of a mechanism to be driven and, mounted in series for driving the same, a drive shaft, a driven shaft, and a hollow fluid container formed of flexible material so connecting them as to transmit driving torque, the flexible material being rubber-like material and cords reinforcing the same, the cords being disposed substantially in radial positions only.

5. The combination of a mechanism to be driven and, mounted in series for driving the same, a pair of shafts, a driving member and a driven member mounted upon them respectively and formed with juxtaposed surfaces, and a fluid-containing bag mounted between, and held to a pronouncedly flattened form throughout its length by contact of, the said surfaces, the bag being reinforced by cords disposed substantially in radial positions only.

6. The combination of a mechanism to be driven and, mounted in series for driving the same, a pair of drive members, one within the other and, between them, a fluid-containing bag formed with flexible, longitudinal ribs having frictional drive engagement with one of the members substantially throughout the circle of the assembly.

7. The combination of a mechanism to be driven and, mounted in series for driving the same, a pair of shafts, a driving member and a driven member mounted upon them respectively and formed with juxtaposed surfaces, and a fluid-containing bag mounted between said surfaces, one of said surfaces and the bag having circular rib-and-groove engagement substantially throughout the circle of the assembly for transmitting the torque solely by friction.

8. The combination of a mechanism to be driven, a pair of shafts in series for driving the same, a driving member and a driven member mounted upon said shafts respectively and formed with juxtaposed and at least substantially annular surfaces, a bag mounted between, and held to an oblong cross-sectional form, with its smaller dimension radial to the axis of rotation, at least substantially throughout its length, by contact of, said surfaces, with its side-walls substantially unconfined and freely-flexing and torque-transmitting in service, and a cushioning substance in said bag.

9. The combination of a mechanism to be driven, a pair of shafts in series for driving the same, a driving member and a driven member mounted upon said shafts respectively and formed with juxtaposed and at least substantially annular surfaces, a bag mounted between, and held to an oblong cross-sectional form, with its smaller dimension radial to the axis of rotation, at least substantially throughout its length, by contact of, said surfaces, with its side-walls substantially unconfined and freely-flexing and torque-transmitting in service, and a cushioning substance in said bag, the bag being reinforced by cords disposed substantially in radial planes only.

THOMAS L. FAWICK.